Patented Aug. 25, 1942

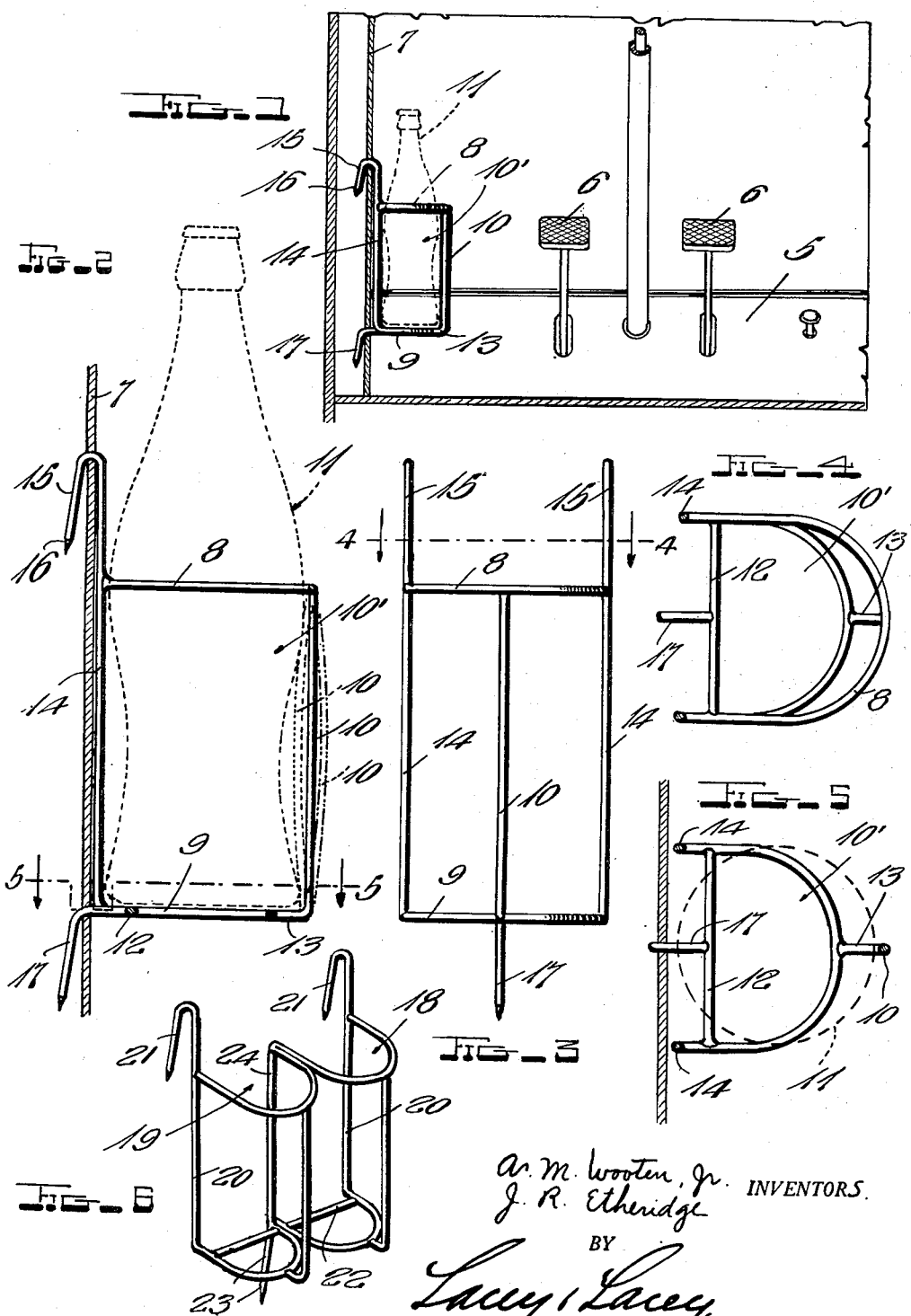

2,294,151

UNITED STATES PATENT OFFICE 2,294,151

BOTTLE RACK FOR AUTOMOBILES AND OTHER MOTOR VEHICLES

Amos M. Wooten, Jr., Roanoke Rapids, and Joseph R. Etheridge, Pinetops, N. C.

Application September 23, 1941, Serial No. 412,012

5 Claims. (Cl. 211—75)

This invention relates to bottle holders and more particularly to a rack or holder especially designed for attachment to an automobile or other motor driven vehicle.

The object of the invention is to provide a rack or holder of simple and inexpensive construction capable of being readily attached to the cardboard protecting panel of an automobile and by means of which one or more liquid containing bottles may be conveniently supported in an upright position until it is desired to drink the contents thereof.

A further object of the invention is to provide a rack or holder comprising a wire frame structure having one or more compartments for the reception of bottles and provided with upper and lower attaching prongs adapted to pierce the cardboard protecting panel for detachably retaining the rack or holder in position thereon.

A further object is to form the frame of the holder of pliable wire or similar material so as to permit the wire to be bent inwardly against a bottle to prevent rattling or breakage thereof during transit.

A still further object of the invention is generally to improve this class of devices so as to increase their utility, durability and efficiency as well as to reduce the cost of manufacture.

In the accompanying drawing forming a part of this specification and in which similar numerals of reference indicate corresponding parts in all the figures of the drawing:

Figure 1 is a vertical sectional view of a portion of an automobile showing the improved bottle rack or holder in position on the cardboard protecting panel, Figure 2 is an enlarged side elevation partly in section, Figure 3 is a front view of the rack or holder detached, Figure 4 is a transverse sectional view taken on the line 4—4 of Figure 3, Figure 5 is a similar view taken on the line 5—5 of Figure 2, and Figure 6 is a perspective view showing a rack or holder adapted to support two bottles.

The improved bottle rack or holder forming the subject-matter of the present invention is particularly designed for use in connection with automobiles or other motor vehicles, and in Figure 1 of the drawing is shown in position on an automobile of standard construction in which 5 designates the floor board, 6 the operating pedals and 7 the usual cardboard protecting panel disposed at the side of said automobile beneath the instrument board.

The holder is preferably constructed of pliable wire of suitable gage and weight and comprises upper and lower supporting members or loops 8 and 9 of different sizes having their rear ends open and their front portions connected by an intermediate vertically disposed rod 10, said parts defining a compartment 10' for the reception of a soft drink bottle or the like, indicated at 11.

Extending across the lower supporting member or loop 9 and connected in any suitable manner to the opposite sides thereof is a transverse bar 12 which in conjunction with the curved forward portion of the lower member 9 forms the bottom of the compartment on which the bottle 11 is adapted to rest. As the lower loop or member 9 of the holder is smaller than the upper loop, the lower end of the connecting rod 10 is bent inwardly to form an offset portion 13 to accommodate the base of the bottle. The rear open ends of the upper and lower loops 8 and 9 are connected by vertical rods 14, the upper ends of which are bent downwardly to form attaching hooks 15 having pointed terminals 16 adapted to pierce the cardboard panel 7 and thus detachably hold the rack in position on said panel. Projecting downwardly from the intermediate portion of the transverse bar 12 is an auxiliary hook or spur 17 which also pierces the panel 7 and serves to prevent lateral movement of the lower end of the holder.

In using the device, suitable openings are formed in the cardboard panel with a nail, screwdriver or other suitable tool, after which the piercing points of the hooks 15 and 17 are passed therethrough and in which position the holder will be supported on the panel in parallel relation to the exposed face thereof, as best shown in Figure 1 of the drawing. Should the bottle 11 be too small to snugly fit within the compartment of the holder, the pliable walls of either the upper or lower supporting members or loops may be bent inwardly in contact with the bottle so as to cushion the bottle and prevent rattling or breakage thereof when the automobile is in transit.

In Figure 6 of the drawing, there is illustrated a modified form of the invention capable of supporting two bottles. In this form of the device, the supporting frame of the holder is bent to form companion compartments 18 and 19, the vertical connecting rods 20 of said compartments being provided with terminal piercing hooks 21 and the lower transverse bar 22 being provided with a single depending attaching spur, indicated at 23. The wire forming the inner walls of the upper and lower loops is united in any suitable manner and connected by an intermediate vertical reinforcing rod 24.

It will, of course, be understood that the rack or holder may be used for supporting any kind of bottles, such as soft drink bottles, beer bottles, milk bottles or any kind of liquid containers and that the rack or holder may be attached to either or both sides of an automobile or at any other desired place thereon.

It will further be understood that the devices may be made in different sizes and shapes and constructed of any suitable material without departing from the spirit of the invention.

Having thus described the invention, what is claimed as new is:

1. A bottle holder comprising a supporting frame including upper and lower loops having their rear ends open and defining a bottle receiving compartment, the lower loop being smaller than the upper loop, spaced vertical rods connecting the loops at the open ends thereof and having their upper ends bent downwardly to form suspension hooks for engagement with a support, a transverse bar connecting the walls of the lower loop, a single rod connected to the outer portions of the loops and having a bent portion connected to the loops, and a spur depending from the transverse bar and coacting with the hooks for securing the holder on said support.

2. A bottle holder comprising a supporting frame including upper and lower loops having their rear ends open and defining a compartment for the reception of a bottle, the lower loop being smaller than the upper loop, vertical rods connecting said loops at the open ends thereof and having their upper ends fashioned to form depending hooks for engagement with a support, a transverse bar connecting the walls of the lower loop, and a vertical rod connecting the forward ends of the loops between the first-mentioned rods and having its lower end bent and disposed in horizontal alinement with the lower loop.

3. A bottle holder comprising a supporting frame including upper and lower loops having their rear ends open and defining a bottle receiving compartment, the lower loop being smaller than the upper loop, vertical rods connecting said loops at the open ends thereof and provided with terminal depending hooks for engagement with a support, a transverse bar connecting the walls of the lower loop, a vertical rod connecting the outer ends of the loops, and an attaching spur depending from the transverse bar and coacting with said hooks.

4. A bottle holder comprising a supporting frame including upper and lower loops defining a bottle receiving compartment, the lower loop being smaller than the upper loop, front and rear vertical rods connecting the loops, the upper ends of the rear rods being provided with terminal suspension members for engagement with a support, a transverse bar connecting the walls of the lower loop, and a suspension member connected to said transverse bar and offset with respect to the upper suspension members, said loops being formed of pliable material to permit the walls of said loops to be bent inwardly against a bottle in the compartment to cushion the bottle and prevent rattling and breakage thereof during transit.

5. A bottle holder comprising a supporting frame including upper and lower loops having their rear ends open and defining a bottle receiving compartment, the lower loop being smaller than the upper loop, rods connecting said loops at the open ends thereof and having their upper portions bent downwardly to form depending hooks having terminal piercing points for engagement with a support, a vertical rod connecting the forward portions of said loops and disposed between the first-mentioned rods, the last-mentioned rod having its lower end bent and disposed in horizontal alinement with the lower loop, a transverse bar connecting the walls of the lower loop, and an attaching spur depending from said transverse bar adjacent the center thereof and coacting with the hooks for detachably supporting the holder on said support.

AMOS M. WOOTEN, Jr.
JOSEPH R. ETHERIDGE.